United States Patent
Zadesky et al.

(10) Patent No.: US 7,966,785 B2
(45) Date of Patent: Jun. 28, 2011

(54) LAMINATED DISPLAY WINDOW AND DEVICE INCORPORATING SAME

(75) Inventors: Stephen Zadesky, Portola Valley, CA (US); Tang Yew Tan, San Francisco, CA (US); John Benjamin Filson, San Jose, CA (US); Stephen Brian Lynch, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 914 days.

(21) Appl. No.: 11/843,305

(22) Filed: Aug. 22, 2007

(65) Prior Publication Data
US 2009/0049773 A1 Feb. 26, 2009

(51) Int. Cl.
*E04C 2/38* (2006.01)
(52) U.S. Cl. ............ 52/656.5; 52/656.2; 52/656.1; 239/362; 239/363
(58) Field of Classification Search .......... 239/9, 8, 239/225, 337, 362–363, 351, 369; 169/5, 169/9, 8, 18; 52/656.5, 656.2, 656.1, 204.62, 52/786.1
See application file for complete search history.

(56) References Cited

U.S. PATENT DOCUMENTS

| | | | |
|---|---|---|---|
| 4,857,376 A | | 8/1989 | Von Reis et al. |
| 7,304,837 B2 * | | 12/2007 | Lo et al. .......... 361/679.27 |
| 7,515,431 B1 * | | 4/2009 | Zadesky et al. .......... 361/752 |
| 7,558,054 B1 * | | 7/2009 | Prest et al. .......... 361/679.3 |
| 2001/0002145 A1 * | | 5/2001 | Lee et al. .......... 349/58 |
| 2003/0012936 A1 | | 1/2003 | Draheim et al. |

FOREIGN PATENT DOCUMENTS

| | | |
|---|---|---|
| JP | 2003 108018 | 4/2003 |
| JP | 2004 205985 | 7/2004 |
| JP | 2006 010748 | 1/2006 |
| WO | WO92/16889 | 10/1992 |
| WO | WO01/53074 | 7/2001 |
| WO | WO2007/089270 | 8/2007 |

OTHER PUBLICATIONS

Definition of "bead" from http://dictionary.reference.com/browse/bead (accessed on Oct. 15, 2010).

* cited by examiner

*Primary Examiner* — Richard E Chilcot, Jr.
*Assistant Examiner* — Mark R Wendell
(74) *Attorney, Agent, or Firm* — Ropes & Gray LLP; Jeffrey H. Ingerman

(57) ABSTRACT

A laminated window assembly for a device, such as a handheld electronic device (e.g., a media player or mobile telephone), includes a window layer that preferably is glass, and a larger, substantially transparent lip-forming layer to which it is laminated, preferably by a substantially clear adhesive. Additional adhesive preferably is placed at at least portions of the edge of the window layer adjacent the lip-forming layer, especially at the corners, to resist delamination. Holes preferably are formed in the lip—e.g., at the corners—to resist the lip-forming layer peeling apart from the window layer forming layer. The holes preferably make up at most about 33% of the periphery of the window layer.

48 Claims, 4 Drawing Sheets

LAMINATED DISPLAY WINDOW AND DEVICE INCORPORATING SAME

BACKGROUND OF THE INVENTION

This invention relates to a laminated display window, especially for a handheld electronic device, which is resistant to delamination.

It is desirable to provide a glass display window in a handheld electronic device such a media player or a mobile telephone. A glass window is more resistant to scratching than most plastic windows, and may be more suitable for certain types of touch-sensitive displays.

One way to mount a display window is to provide a lip on the window, so that the window fits into the opening of a bezel, while the bezel captures the lip to retain the window. However, it is difficult to create a glass window with such a lip. Whether the glass is molded with a lip, or ground from a larger piece of glass, there may be stresses in such a piece of glass that make it more susceptible to breakage, either in handling before assembly into the device, or if the assembled device is dropped.

One alternative is to laminate the window glass to a larger transparent substrate, which may be another piece of glass or a suitable plastic. The edges of the larger substrate protrude beyond the edges of the window glass to form the desired lip. However, this alternative is not without other difficulties, including, in particular, the risk of delamination.

Lamination is frequently accomplished using a clear adhesive. However, many adhesives, while having high shear strength, have lower peel strength. Thus, any event, such as dropping of the device, that tends to try to separate the layers at the edges may cause delamination by peeling. This is particularly true if the laminated window structure is deformed at its corner, where the peel strength is lowest. Delamination is undesirable because it may compromise the strength of the laminated window or introduce defects into the visible area of the window, or, if there is a greater degree of delamination, it may create a safety hazard.

It would be desirable to be able to provide a laminated display window with increased resistance to delamination.

SUMMARY OF THE INVENTION

In accordance with the present invention, delamination resistance of a laminated display window is increased by reducing the susceptibility of the laminated layers to peel along the edge, in the corners, or both. Thus, in addition to whatever method is used to bond the layers to one another, an adhesive may be placed in the corners or along part or all of the periphery of the outer window layer where the lip formed by the lower layer protrudes. This adhesive strengthens the bonding along those edges or in those corners, resisting delamination.

Preferably, where the adhesive is used along the periphery, a channel or chamfer may be formed in which the adhesive is placed. This gives the adhesive more surface area to which to bond, and also decreases the risk of oozing of displaced adhesive. The channel or chamfer may be formed in one of the layers, and preferably in the lower, larger layer, or in the surrounding structure of the handheld device, such as in the display bezel.

In addition, holes or gaps may be formed in the lip adjacent the edges and/or corners of the window glass to provide strain relief. If the lip were to be deformed by an event, it would not, at least in the areas of the holes or gaps, pull on the interface between the layers, thereby avoiding peeling apart the layers. The percentage of the periphery in which such holes or gaps are formed should not be so large that the lip is unable to reliably perform its function of retaining the window in the bezel. Preferably, such holes or gaps are formed only in the corners, and in any event are not formed along more than about 33% of the periphery.

In another embodiment, the strain relief gaps or holes may be used alone, without the additional adhesive around the periphery.

Therefore, in accordance with the present invention, there is provided a laminated window assembly for a device. The assembly includes (a) a window layer of a first substantially transparent material and having a periphery, and (b) a lip-forming layer, larger than the window layer, of a second substantially transparent material. The lip-forming layer extends beyond the window layer to form a lip for engaging the device. A substantially transparent bonding layer bonds the window layer to the lip-forming layer. An adhesive bead bonds the window layer to the lip-forming layer along at least one portion of the periphery. Holes may be formed in the lip for strain relief, to help prevent deformation of the lip from delaminating the assembly. If such strain relief is provided, it may be used with or without the adhesive bead.

A device incorporating such a window assembly also is provided.

BRIEF DESCRIPTION OF THE DRAWINGS

Further features of the invention, its nature and various advantages, will be apparent upon consideration of the following detailed description, taken in conjunction with the accompanying drawings, in which like reference characters refer to like parts throughout, and in which.

DETAILED DESCRIPTION

Figure 1:
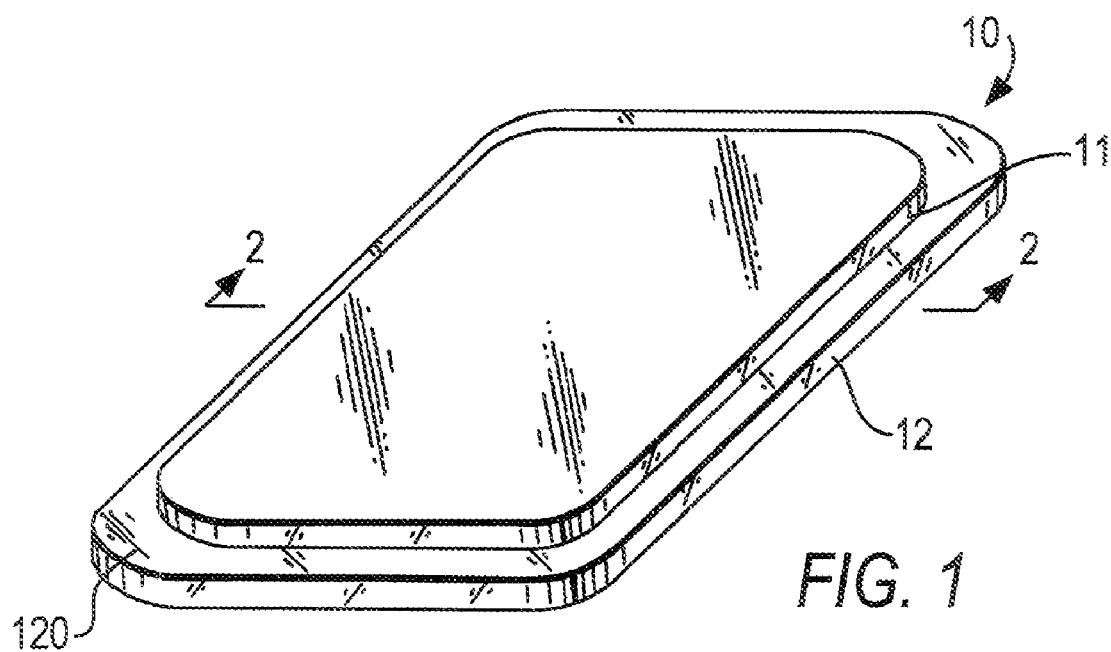
FIG. 1 is a perspective view of a laminated display window in accordance with the present invention.
Figure 2:
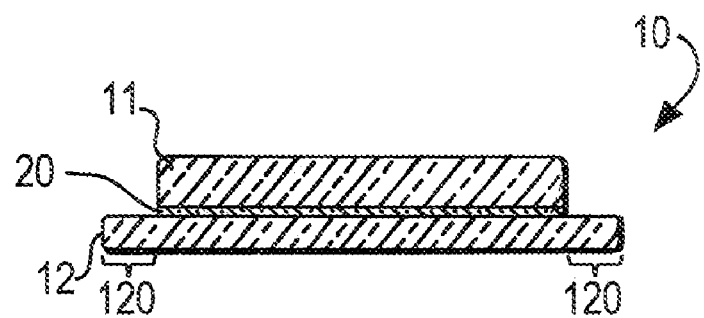
FIG. 2 is a cross-sectional view, taken from line 2-2 of FIG. 1, of the laminated display window of FIG. 1.

A laminated display window assembly 10 with which the present invention may be used is shown in FIGS. 1 and 2.

Assembly 10 includes a window layer 11, and a larger lip-forming layer 12 which is bonded to layer 11 by bonding layer 20. For the reasons stated above, window layer 11 preferably is made of glass, although it may be made from a plastic material, and particularly from a high-molecular-weight plastic material that has many of the desirable characteristics of glass, such as scratch resistance. Other scratch-resistant clear materials, such as sapphire or quart crystal, also may be used.

Lip-forming layer 12 preferably is made from a plastic material, which is more resistant to breakage than glass, but could also be made from glass. Lip-forming layer 12 preferably is sufficiently larger than window layer 11 to form a lip 120 large enough to securely retain assembly 10 in the device in which it is used.

Although both window layer 11 and lip-forming layer 12 are preferably clear, either or both may include printing or decoration on either of its respective surfaces.

Bonding layer 20 could be any suitable clear bond. For example, if both layers are plastic materials, the two layers could be heat-bonded to one another. However, where, as is preferred, at least one layer is glass, then preferably bonding layer 20 is a clear adhesive, and in particular a clear pressure-sensitive adhesive, or a clear liquid adhesive.

Window layer 11 may be a flat glass sheet, preferably between about 0.50 mm and about 0.75 mm in thickness. Suitable glass sheets are available from Asahi Glass Co. Ltd., of Tokyo, Japan, and may be ground if necessary to a desired thickness, although other glass sheets may be used. In some embodiments, the final thickness of window layer 11 may be either 0.55 mm or 0.70 mm. In these embodiments, lip-forming layer 12 may be a 0.30 mm polycarbonate sheet available from Mitsubishi Engineering Plastics Corporation, of Tokyo, Japan (part number MR05GH), although another material could be used, and it may have another thickness. Finally, in this embodiment, bonding layer 20 may be a clear pressure-sensitive adhesive available from 3M Company, of St. Paul, Minn. (part number 8167 or 9483), although another clear pressure-sensitive or liquid adhesive could be used. These are only exemplary and any combination of materials, thicknesses and adhesives providing the desired properties—i.e., strength, clarity, etc.—may be used.

It should be noted in this regard that while any material used for window layer 11 or lip-forming layer 12 should be as scratch-resistant as possible, the provision of a scratch-resistant coating or "hard coat" may decrease the adhesion between layers 11 and 12. Therefore, it may be desirable to omit such coatings on the mating faces of layers 11 and 12, with the understanding that the risk of scratching prior to assembly would be increased unless extra care to avoid scratching is taken.

Figure 3:
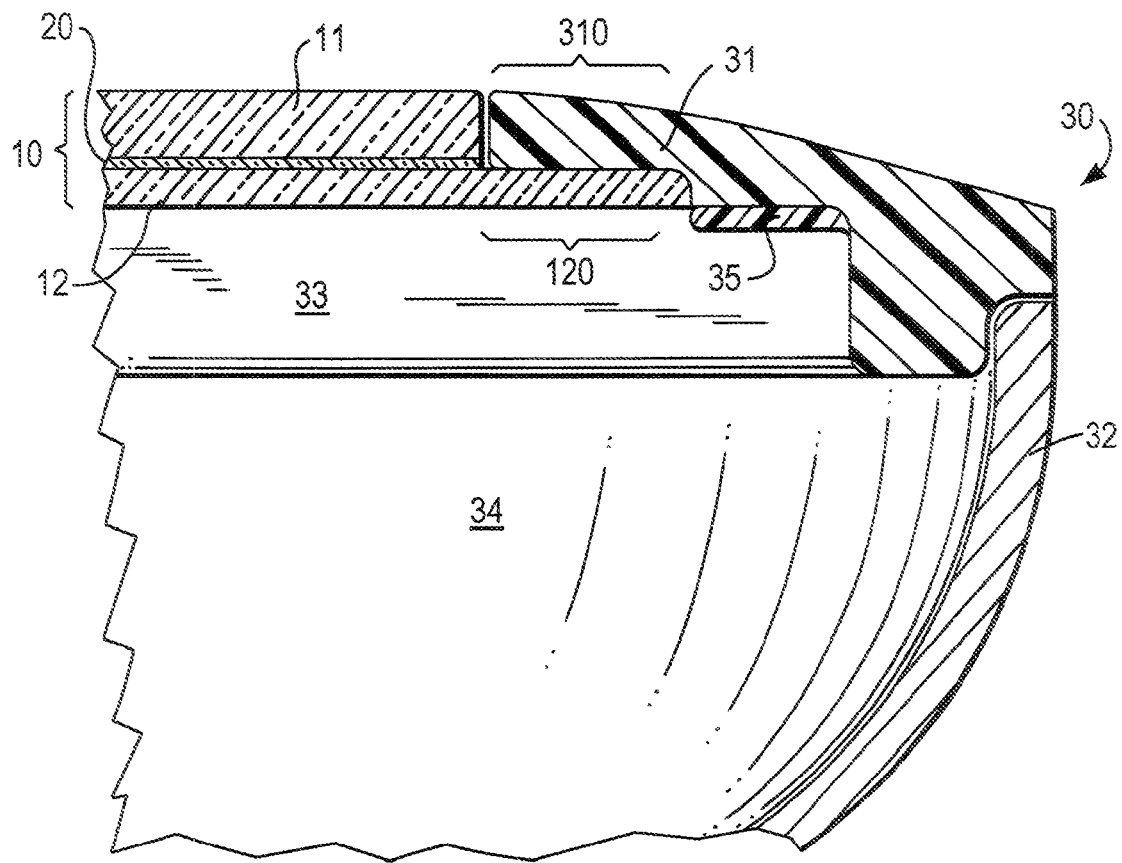
FIG. 3 is a fragmentary cross-sectional view of a device in which the laminated display window according to the present invention is mounted.

The fragmentary cross-sectional view of FIG. 3 shows how window assembly 10 is retained in an exemplary device 30. A bezel 31, affixed to casing 32, has an extension 310 that extends over lip 120 to retain assembly 10. Beneath assembly 10 there may be a display module 33 (e.g., a liquid crystal display), while space 34 may contain other components of the device (circuitry, batteries, etc.). A gasket 35 may be provided between bezel 31 and module 33.

Although window layer 11 is shown as a single clear sheet that fits within the opening of bezel 31, it may be desirable to include one or more separate pieces that serve a decorative or functional purpose. For the purposes of this description and the claims that follow, any such collection of multiple pieces bonded to lip-forming layer 12 and fitting within the opening in bezel 31 may be considered collectively as window layer 11.

Figure 4:
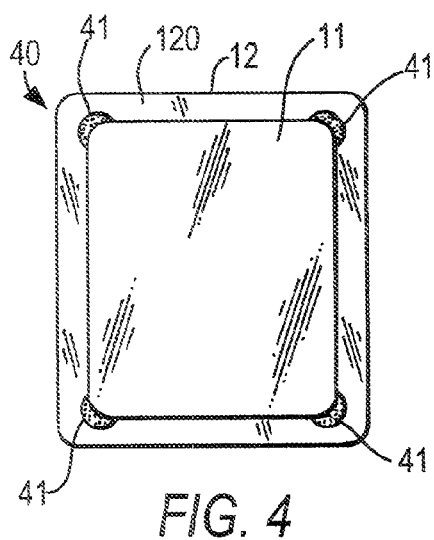
FIG. 4 is a schematic view showing placement of adhesive at the corners of the laminated display window according to a preferred embodiment of the present invention.
Figure 5:
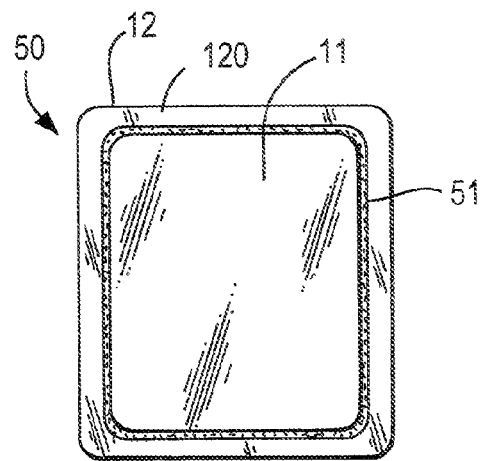
FIG. 5 is a schematic view showing placement of adhesive around the periphery of the laminated display window according to the present invention.

In accordance with the present invention, the risk of delamination of window assembly 10—e.g., in case of a drop event—may be reduced by providing additional adhesive at the edge of window layer 11 adjacent lip-forming layer 12. In one preferred embodiment 40 shown in FIG. 4, adhesive 41 is applied at the corners of window layer 11, providing additional adhesion where the peel strength is lowest. At the other extreme, in another preferred embodiment 50 shown in FIG. 5, a bead 51 of additional adhesive extends completely around the periphery of window layer 11 adjacent layer 12. In an intermediate embodiment (not shown), a plurality of shorter beads of adhesive may be provided along selective stretches of the edge of window layer 11—less than the complete periphery as in FIG. 5, but more than just the corners as in FIG. 4. A suitable adhesive may be DP460 epoxy adhesive available from 3M Company and sold under the trademark SCOTCH-WELD®.

Figure 6:
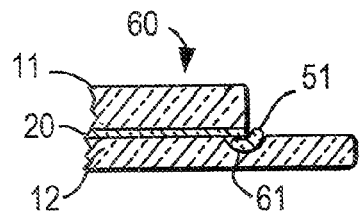
FIG. 6 is a fragmentary cross-sectional view showing provision of a channel in one layer of a laminated display window in accordance with an embodiment of the present invention.
Figure 7:
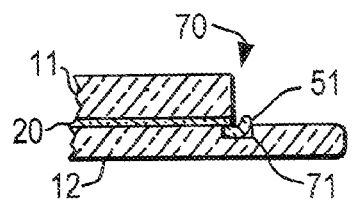
FIG. 7 is a fragmentary cross-sectional view showing provision of a channel in one layer of a laminated display window in accordance with another embodiment of the present invention.

In two variants 60, 70 of embodiment 50, a channel may be provided in lip-forming layer 12 in which adhesive bead 51 is placed. This gives the adhesive more surface area to which to bond, and also decreases the risk of oozing of displaced adhesive. In embodiment 60 (FIG. 6), channel 61 has an arcuate cross section, while in embodiment 70 (FIG. 7), channel 71 has a rectangular cross section. To avoid compromising the integrity of lip 120, the depth of channel 61/71 preferably should not exceed about one-half of the thickness of lip 120.

Figure 8:
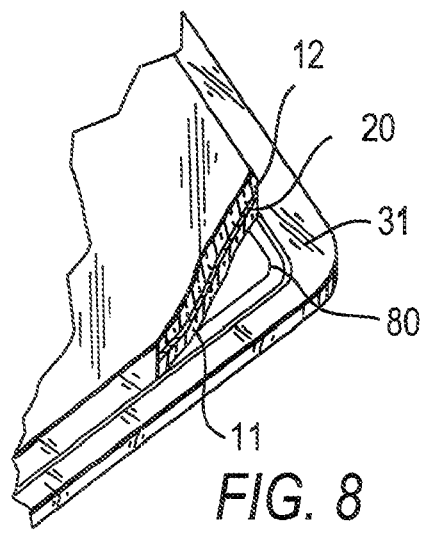
FIG. 8 is a fragmentary perspective view showing provision of a channel in a bezel adjacent the laminated display window in accordance with an embodiment of the present invention.
Figure 9:
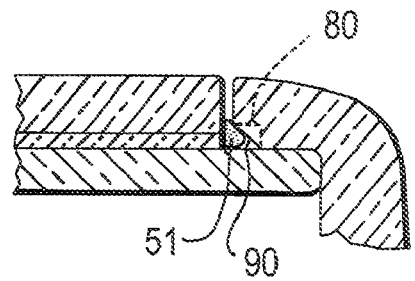
FIG. 9 is a fragmentary cross-sectional view showing provision of a channel in a bezel adjacent the laminated display window in accordance with an embodiment of the present invention.

Instead of providing a channel in lip-forming layer 12, the channel may be provided in device 30, and particularly in the portion adjacent window assembly 10, which in the embodiments shown is bezel 31. In the fragmentary perspective view of FIG. 8, looking from the underside of window assembly 10 and bezel 31, with part of window assembly 10 cut away, a rectangular channel 80 can be seen in bezel 31 for receiving adhesive bead 51. Channel 80 also is shown in phantom in FIG. 9, which primarily shows the provision, as an alternative to channel 80, of a chamfer 90 to receive adhesive bead 51.

Figure 10:
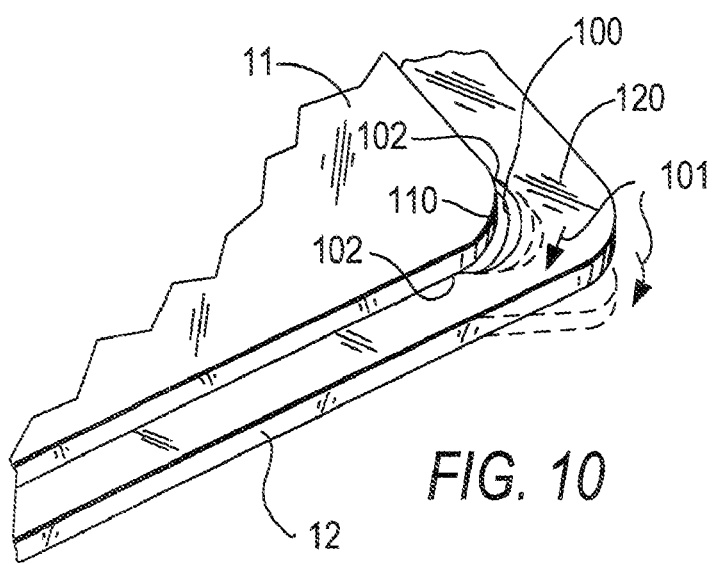
FIG. 10 is a fragmentary perspective view showing provision of strain relief in accordance with an embodiment of the present invention.

In addition to, or instead of, providing adhesive 41/51, the risk of delamination of window assembly 10 can be reduced by providing strain relief features to reduce the peel forces resulting from deformation of lip 120. FIG. 10 shows the provision of a hole or gap 100 in lip 120 adjacent corner 110 of window layer 11. The effect of providing hole or gap 100 is that in the case of flexing of lip 120, as indicated by arrows 101, no force is transmitted to adhesive interface 20 in the area of hole or gap 100.

Thus, in the case of flexing as shown in FIG. 10, although there is transmission of peeling forces at locations 102 adjacent hole or gap 100, there is no transmission of peeling force at corner 110, where peel strength is lowest. It should be noted, however, the holes or gaps 100 could be provided in one or more locations elsewhere along the periphery of window layer 11, instead of, or in addition to, corners 110. One limitation is that the total amount of holes or gaps 100 should not be so great as to compromise the structural integrity of lip 120. Generally, for that reason, holes or gaps 100 should occupy no more than about 33% of the periphery of window layer 11.

As noted above, strain relief holes or gaps 100 could be used instead of, or in addition to, adhesive 41/51 to reduce the risk of delamination of window assembly 10. It will be appreciated, however, that if both adhesive 41/51 and strain relief holes or gaps 100 are used, then adhesive preferably should not be placed in holes or gaps 100, lest force be transmitted across holes or gaps 100 by the adhesive, defeating the strain relief function. Thus, if holes or gaps 100 are placed in corners 110 as in FIG. 10, then embodiment 40 of FIG. 4, where adhesive 41 is present in corners 110, should not be used.

Thus it is seen that a laminated display window with increased delamination resistance has been provided. It will be understood that the foregoing is only illustrative of the principles of the invention, and that various modifications can be made by those skilled in the art without departing from the scope and spirit of the invention, and the present invention is limited only by the claims that follow.

What is claimed is:

1. A laminated window assembly for a device, said assembly comprising:
   a window layer comprising a first substantially transparent material and having a periphery;
   a lip-forming layer larger than said window layer and comprising a second substantially transparent material, said lip-forming layer extending beyond said window layer to form a lip for engaging said device;
   a substantially transparent bonding layer between said window layer and said lip-forming layer; and
   an adhesive bead bonding said periphery of said window layer to said lip-forming layer along at least one portion of said periphery.

2. The laminated window assembly of claim 1 wherein said first substantially transparent material is glass.

3. The laminated window assembly of claim 1 wherein said second substantially transparent material is a plastic material.

4. The laminated window assembly of claim 3 wherein said second substantially transparent material is polycarbonate.

5. The laminated window assembly of claim 1 wherein said at least one portion of said periphery comprises at least one corner of said periphery.

6. The laminated window assembly of claim 5 wherein said at least one corner of said periphery comprises all corners of said periphery.

7. The laminated window assembly of claim 1 wherein said at least one portion of said periphery comprises all of said periphery.

8. The laminated window assembly of claim 7 wherein said lip-forming layer has a channel therein for placement of said adhesive bead.

9. The laminated window assembly of claim 8 wherein said channel has a rectangular cross section.

10. The laminated window assembly of claim 8 wherein said channel has an arcuate cross section.

11. The laminated window assembly of claim 1 wherein said lip-forming layer has a channel therein at least in said at least one portion of said periphery for placement of said adhesive bead.

12. The laminated window assembly of claim 11 wherein said channel has a rectangular cross section.

13. The laminated window assembly of claim 11 wherein said channel has an arcuate cross section.

14. The laminated window assembly of claim 1 wherein said lip has at least one hole therein adjacent said periphery of said window layer, other than at said at least one portion of said periphery, for strain relief, to reduce peeling forces that reach said substantially transparent bonding layer when said lip is flexed.

15. The laminated window assembly of claim 14 wherein said lip has a plurality of said holes.

16. The laminated window assembly of claim 15 wherein said lip has a respective hole adjacent each corner of said periphery of said window layer.

17. The laminated window assembly of claim 15 wherein said plurality of holes totals at most about 33% of said periphery.

18. A device comprising:
    a casing, said casing having a face portion, said face portion having a window opening therein; and
    a laminated window assembly, said laminated window assembly comprising:
    a window layer comprising a first substantially transparent material and having a periphery, said window layer being substantially identical in size and shape to said opening;
    a lip-forming layer larger than said window layer and comprising a second substantially transparent material, said lip-forming layer extending beyond said window layer to form a lip for engaging said device;
    a substantially transparent bonding layer between said window layer and said lip-forming layer; and
    an adhesive bead bonding said periphery of said window layer to said lip-forming layer along at least one portion of said periphery.

19. The device of claim 18 wherein said first substantially transparent material is glass.

20. The device of claim 18 wherein said second substantially transparent material is a plastic material.

21. The device of claim 20 wherein said second substantially transparent material is polycarbonate.

22. The device of claim 18 wherein said at least one portion of said periphery comprises at least one corner of said periphery.

23. The device of claim 22 wherein said at least one corner of said periphery comprises all corners of said periphery.

24. The device of claim 18 wherein said at least one portion of said periphery comprises all of said periphery.

25. The device of claim 24 wherein said lip-forming layer has a channel therein for placement of said adhesive bead.

26. The device of claim 25 wherein said channel has a rectangular cross section.

27. The device of claim 25 wherein said channel has an arcuate cross section.

28. The device of claim 24 wherein said face portion has a channel therein for placement of said adhesive bead.

29. The device of claim 28 wherein said channel has a rectangular cross section.

30. The device of claim 28 wherein said channel is formed by a chamfer in said face portion.

31. The device of claim 18 wherein said lip-forming layer has a channel therein at least in said at least one portion of said periphery for placement of said adhesive bead.

32. The device of claim 31 wherein said channel has a rectangular cross section.

33. The device of claim 31 wherein said channel has an arcuate cross section.

34. The device of claim 18 wherein said face portion has a channel therein for placement of said adhesive bead.

35. The device of claim 34 wherein said channel has a rectangular cross section.

36. The device of claim 34 wherein said channel is formed by a chamfer in said face portion.

37. The device of claim 18 wherein said lip has at least one hole therein adjacent said periphery of said window layer, other than at said at least one portion of said periphery, for strain relief, to reduce peeling forces that reach said substantially transparent bonding layer when said lip is flexed.

38. The device of claim 37 wherein said lip has a plurality of said holes.

39. The device of claim 38 wherein said lip has a respective hole adjacent each corner of said periphery of said window layer.

40. The device of claim 38 wherein said plurality of holes totals at most about 33% of said periphery.

41. A laminated window assembly for a device, said assembly comprising:
- a window layer comprising a first substantially transparent material and having a periphery;
- a lip-forming layer larger than said window layer and comprising a second substantially transparent material, said lip-forming layer extending beyond said window layer to form a lip for engaging said device; and
- a substantially transparent bonding layer between said window layer and said lip-forming layer; wherein:
- said lip-forming layer has at least one hole therein adjacent said periphery of said window layer for strain relief, to reduce peeling forces that reach said substantially transparent bonding layer when said lip is flexed.

42. The laminated window assembly of claim 41 wherein said lip has a plurality of said holes.

43. The laminated window assembly of claim 42 wherein said lip has a respective hole adjacent each corner of said periphery of said window layer.

44. The laminated window assembly of claim 42 wherein said plurality of holes totals at most about 33% of said periphery.

45. A device comprising:
- a casing, said casing having a face portion, said face portion having a window opening therein; and
- a laminated window assembly, said laminated window assembly comprising:
- a window layer comprising a first substantially transparent material and having a periphery, said window layer being substantially identical in size and shape to said opening, and having a periphery;
- a lip-forming layer larger than said window layer and comprising a second substantially transparent material, said lip-forming layer extending beyond said window layer to form a lip for engaging said device; and
- a substantially transparent bonding layer between said window layer and said lip-forming layer; wherein:
- said lip has at least one hole therein adjacent said periphery of said window layer for strain relief, to reduce peeling forces that reach said substantially transparent bonding layer when said lip is flexed.

46. The device of claim 45 wherein said lip has a plurality of said holes.

47. The device of claim 46 wherein said lip has a respective hole adjacent each corner of said periphery of said window layer.

48. The device of claim 46 wherein said plurality of holes totals at most about 33% of said periphery.

* * * * *